US008602144B2

(12) United States Patent
Boskovitch et al.

(10) Patent No.: US 8,602,144 B2
(45) Date of Patent: Dec. 10, 2013

(54) DIRECT ELECTRICAL CONNECTION FOR MULTI-MOTOR HYBRID DRIVE SYSTEM

(75) Inventors: Paul Boskovitch, Costa Mesa, CA (US); J. Axel Radermacher, Foothill Ranch, CA (US)

(73) Assignee: Fisker Automotive, Inc., Anaheim, CA (US)

( * ) Notice: Subject to any disclaimer, the term of this patent is extended or adjusted under 35 U.S.C. 154(b) by 0 days.

(21) Appl. No.: 13/336,571

(22) Filed: Dec. 23, 2011

(65) Prior Publication Data

US 2012/0187758 A1 Jul. 26, 2012

Related U.S. Application Data (63) Continuation of application No. PCT/US2010/040004, filed on Jun. 25, 2010.

(60) Provisional application No. 61/220,421, filed on Jun. 25, 2009, provisional application No. 61/288,709, filed on Dec. 21, 2009, provisional application No. 61/294,722, filed on Jan. 13, 2010.

(51) Int. Cl.
*B60L 11/12* (2006.01)

(52) U.S. Cl.
USPC ............. 180/65.22; 180/65.245; 318/139

(58) Field of Classification Search
USPC ............. 180/65.245, 65.22, 65.265, 65.275, 180/65.8; 318/139, 140; 307/10.1; 903/903; 74/661

See application file for complete search history.

(56) References Cited

U.S. PATENT DOCUMENTS

| 3,129,607 | A  | * | 4/1964  | Schaefer ............. 74/665 GA |
|-----------|----|---|---------|---------------------------------|
| 3,665,386 | A  | * | 5/1972  | Dosch .................... 180/287 |
| 5,589,743 | A  | * | 12/1996 | King ...................... 318/139 |
| 6,253,127 | B1 | * | 6/2001  | Itoyama et al. ............. 701/22 |
| 6,554,088 | B2 | * | 4/2003  | Severinsky et al. ....... 180/65.23 |
| 6,569,055 | B2 | * | 5/2003  | Urasawa et al. ............... 477/5 |
| 6,634,303 | B1 | * | 10/2003 | Madsen et al. ............... 105/73 |
| 7,117,963 | B2 | * | 10/2006 | Saito et al. ................ 180/65.1 |
| 7,440,827 | B2 | * | 10/2008 | Kawada et al. ................ 701/22 |
| 7,609,022 | B2 | * | 10/2009 | Oyobe et al. ................. 318/800 |
| 7,610,892 | B2 | * | 11/2009 | Butcher et al. ............ 123/179.3 |
| 7,677,342 | B2 | * | 3/2010  | Yonemori et al. ....... 180/65.285 |
| 7,813,848 | B2 | * | 10/2010 | Seo et al. ..................... 701/22 |
| 7,973,424 | B2 | * | 7/2011  | King ......................... 307/10.1 |
| 8,008,876 | B2 | * | 8/2011  | Yonemori et al. ............ 318/151 |
| 8,026,679 | B2 | * | 9/2011  | Seo et al. ..................... 318/139 |
| 8,198,836 | B2 | * | 6/2012  | Kachi et al. .................. 318/139 |
| 8,212,506 | B2 | * | 7/2012  | Iwahori et al. ............. 318/400.3 |
| 8,253,356 | B2 | * | 8/2012  | Itoh et al. ..................... 318/139 |
| 2002/0135234 | A1 | * | 9/2002 | Chekhet et al. ................ 307/82 |
| 2003/0102673 | A1 | * | 6/2003 | Nada ........................... 290/40 C |
| 2005/0162013 | A1 | * | 7/2005 | Brown, Jr. ................... 307/10.1 |
| 2006/0021809 | A1 | * | 2/2006 | Xu et al. ...................... 180/65.2 |

(Continued)

*Primary Examiner* — Katy M Ebner
*Assistant Examiner* — Brodie Follman
(74) *Attorney, Agent, or Firm* — Foley & Lardner LLP (57) ABSTRACT

A system for a hybrid vehicle includes an engine; a first inverter coupled to a second inverter; a first electrical machine coupled to the engine and the first inverter; a second electrical machine coupled to the second inverter and a wheel axle of the vehicle; a high voltage battery coupled to both the first inverter and the second inverter; and a switch box disposed between the first electrical machine and the second electrical machine. The switch box includes switches adapted to switch open and closed to allow direct electrical connection from the first electrical machine to the second electrical machine.

13 Claims, 12 Drawing Sheets

(56) References Cited

U.S. PATENT DOCUMENTS

| | | | |
|---|---|---|---|
| 2006/0152180 A1* | 7/2006 | Tahara et al. | 318/139 |
| 2007/0000703 A1* | 1/2007 | Hughes et al. | 180/65.4 |
| 2007/0227792 A1* | 10/2007 | Yonemori et al. | 180/65.3 |
| 2007/0233332 A1* | 10/2007 | Kawada et al. | 701/13 |
| 2007/0274109 A1* | 11/2007 | Oyobe et al. | 363/37 |
| 2007/0296359 A1* | 12/2007 | Seo et al. | 318/139 |
| 2008/0006467 A1* | 1/2008 | Morishita et al. | 180/365 |
| 2008/0051949 A1* | 2/2008 | Seo et al. | 701/22 |
| 2008/0265828 A1* | 10/2008 | Ganev et al. | 318/777 |
| 2009/0043437 A1* | 2/2009 | Shiino | 701/22 |
| 2009/0115358 A1* | 5/2009 | Kachi et al. | 318/139 |
| 2009/0143189 A1* | 6/2009 | Hasegawa et al. | 477/5 |
| 2009/0143930 A1* | 6/2009 | Seo et al. | 701/22 |
| 2009/0236160 A1* | 9/2009 | Tanaka et al. | 180/65.265 |
| 2010/0145589 A1* | 6/2010 | Kobayashi | 701/93 |
| 2011/0093151 A1* | 4/2011 | Kojima et al. | 701/22 |
| 2012/0186391 A1* | 7/2012 | Boskovitch et al. | 74/661 |

* cited by examiner

DIRECT ELECTRICAL CONNECTION FOR MULTI-MOTOR HYBRID DRIVE SYSTEM

CROSS-REFERENCE TO RELATED APPLICATION

This application claims the benefit of U.S. Provisional Patent Applications No. 61/220,421, filed Jun. 25, 2009, No. 61/288,709 filed Dec. 21, 2009, and No. 61/294,722 filed Jan. 13, 2010, the disclosures of which are incorporated herein by reference in their entireties.

BACKGROUND

The present disclosure relates generally to a hybrid vehicle, and more particularly to a series hybrid electric vehicle power train.

DESCRIPTION OF THE RELATED ART

Vehicles, such as a motor vehicle, utilize an energy source in order to provide power to operate a vehicle. While petroleum based products dominate as an energy source, alternative energy sources are available, such as methanol, ethanol, natural gas, hydrogen, electricity, solar or the like. A hybrid powered vehicle utilizes a combination of energy sources in order to power the vehicle. Such vehicles are desirable since they take advantage of the benefits of multiple fuel sources, in order to enhance performance and range characteristics of the hybrid vehicle relative to a comparable gasoline powered vehicle.

A series hybrid vehicle will utilize power provided by an engine mounted generator to power the motor driving the wheels. With such an arrangement, energy is transmitted from the engine to the wheels through various predefined conversion points. While this system works, each energy conversion point is less that 100% efficient, therefore there are energy losses throughout the process. As a result, fuel consumption increases and larger more expensive components may be required to satisfy power demands. Additionally, the engine, generator, and generator inverter all must be sized to handle peak engine power.

Thus there is a need in the art for a system and method of reducing energy losses through direct electrical connections between components and minimizing component size. There is a further need in the art for a drive system that reduces energy losses through direct electrical connections between components and that includes a transmission between the engine and electric machine (acting primarily as a generator) to improve system operating efficiency of the engine and electric machine by controlling the relative speed relationship therebetween.

SUMMARY

Accordingly, the present disclosure relates to a system for a hybrid vehicle including (a) an engine; (b) a first inverter coupled to a second inverter; (c) a first electrical machine coupled to the engine and the first inverter; (d) a second electrical machine coupled to the second inverter and a wheel axle of the vehicle; (e) a high voltage battery coupled to both the first inverter and the second inverter; and (f) a switch box disposed between the first electrical machine and the second electrical machine. The switch box having switches adapted to switch open and closed to allow direct electrical connection from the first electrical machine to the second electrical machine.

An advantage of the present disclosure is that a hybrid vehicle is provided that includes an engine, an electric machine, and a transmission disposed therebetween. Another advantage of the present disclosure is that the operating efficiency of the electric machine is improved, resulting in decreased fuel consumption. A further advantage of the present disclosure is that the size of the engine and electric machine can be reduced due to the improved operating efficiency. Still another advantage is that series drive efficiency is improved by reducing the AC-DC energy conversion losses when the engine is operational. Yet another advantage is the unique power split arrangement of the transmission from 4-N gears when the engine is operational. Still yet another advantage is that the unique gear split arrangement implements a 2 speed low loss transmission for the electric traction system and decouples the engine gears. A further advantage of the present disclosure is that it allows for downsizing of the inverters associated with both the generator and traction motors. Still a further advantage of the present disclosure is that the low temperature thermal system may be downsized. Yet a further advantage of the present disclosure is that peak power at a high speed drive mode is improved. Another advantage of the present disclosure is the potential to downsize the engine through a 10-20% reduction in power requirements. Other potential advantages is that the invention can be used for PHEV or HEV applications, can be scalable between a PHEV and an HEV, a reduced power electronics duty cycle improves reliability, increased number of limp home modes are available and the architecture is applicable to front, rear or all wheel drive applications.

Other features and advantages of the present disclosure will be readily appreciated, as the same becomes better understood after reading the subsequent description taken in conjunction with the accompanying drawings.

DESCRIPTION

Figure 1:
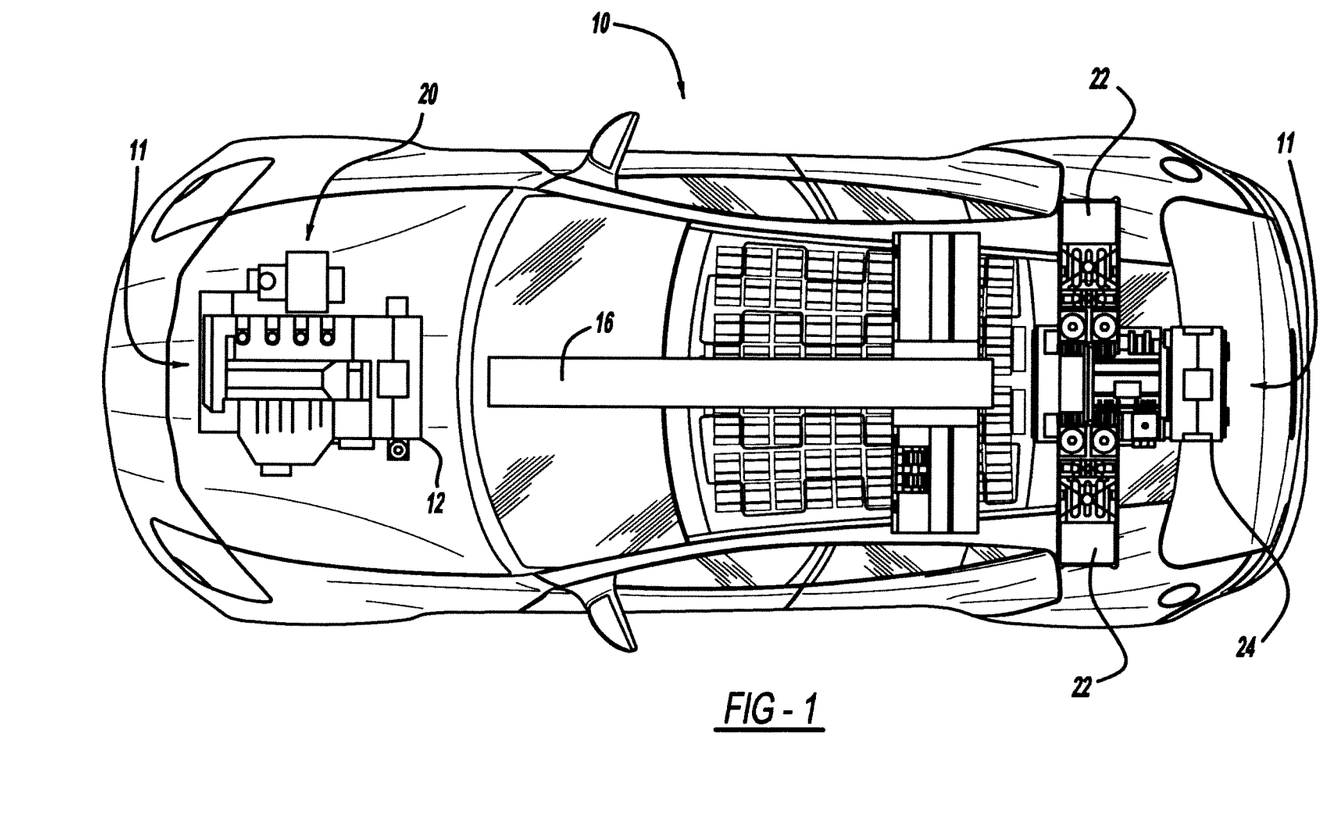
FIG. 1 is an example of powertrain architecture for a hybrid electric vehicle.

The present disclosure provides for a system and method of direct electrical connection (e-Direct) for a multi-motor hybrid drive system. Referring to FIG. 1, a hybrid vehicle 10 is illustrated. In this example the vehicle 10 can be a plug-in hybrid vehicle powered by an internal combustion engine 20 and a battery 16 operable to be charged off-board. Both the engine 20 and the battery 16 can function as a power source for the vehicle 10. The vehicle 10 can be powered by each power source independently or in cooperation. A hybrid vehicle that uses a series configuration, such as an engine driving a generator and the generator providing electrical power to a drive motor, can utilize this architecture. The vehicle 10 could be a passenger vehicle, truck, off-road equipment, etc.

Vehicle 10 also includes a drivetrain 11 that operatively controls movement of the vehicle. A motor 24, that mechanically drives an axle of the vehicle that moves wheels of the vehicle, is powered by the power sources (i.e., a battery, engine, and/or generator). In the example of FIG. 1, vehicle 10 is a rear wheel drive vehicle with the rear wheels mechanically driven by motors 24. Motors 24 and generator 12 can be referred to as an electrical machine. In an example, the terms "motor" and "generator" are directed to the flow of energy since each can be operated in reverse to accomplish the opposite function. Therefore, an electric machine can either generate power by operating with a negative shaft torque (i.e., a generator) or distribute power by producing positive shaft torque (i.e., a motor). In FIG. 2-12, the electric machine is referred to as a motor/generator ("MG"). Accordingly, the vehicle can include an MG1 12 coupled to the engine 20 and an MG2 24 coupled to wheels W.

The architecture of the drive train is selectively determined, such as a series, parallel or parallel-split or other such arrangement of the drive train components. In this example the drive train includes a MG1 12 and an MG2 24. Various types of MG's are available, such as an electric motor, or generator, permanent magnet synchronous machine, induction machine, or the like. The MG1 12 can include a housing, a stator disposed in the housing that is stationary, and a rotor that rotates about a central shaft that includes a permanent magnet. The MG1 12 converts mechanical energy received from engine 20 to electrical energy used to provide power to the wheels W, charge the on-board battery 16, or power auxiliary vehicle components. Typically, the output of MG1 12 is A/C power that is converted to D/C power in an inverter 22. The D/C power can then either be delivered to the battery 16 or another inverter 22 to convert back to A/C power before powering any drive motors. Typical of such MGs and inverters, each has a predetermined operating efficiency corresponding to a given speed/torque band.

In this example, the drivetrain 11 also includes a gasoline powered engine 20 that provides supplemental power when required under certain operating conditions. Engine 20 is operatively coupled to MG1 12, such as via an engine output shaft. Accordingly, when the engine 20 runs, the MG1 12 typically runs as a result of their engagement to each other. The engine 20 can also have a predetermined operating efficiency at a corresponding speed/torque band. However, the ratio of engine speed efficiency with respect to generator speed efficiency may not be optimal within a particular speed/torque band.

Referring to the FIGS. 2-12, exemplary systems and methods of direct electrical connection (e-Direct) for multi-motor hybrid drive systems are illustrated. These are for illustrative purposes, and others embodiments consistent with the present disclosure are contemplated. The vehicle 10 includes a power train that controls the operation of the vehicle. In these examples, the power train is a plug-in hybrid, and includes at least two electrical machines.

The system includes an energy storage device 16, such as the battery 16 that is in communication with the components that adds or subtracts power within the vehicle system. Various types of batteries are available, such as lead acid, or lithium-ion or the like.

A first inverter 22 is operatively in communication with a second inverter 22, and the second inverter 22 converts DC electrical power back to AC electrical power. The second inverter 22 is operatively in communication with a second electrical machine MG2 24. MG2 24 converts the AC electrical power into mechanical energy that is available for use in the operation of the vehicle. In this example, the mechanical energy is transmitted to a drive shaft in order to control operation of the vehicle wheels W, i.e. front wheels or rear wheels.

It should be appreciated that the energy conversion process is less than 100% efficient, resulting in losses throughout the system. In an example, loss across an inverter can range from about 3% to 10%. The first electrical machine (MG1 12) is directly in electrical communication with the second electrical machine (MG2 24), so that AC power from the first electrical machine directly provides power to the second electrical machine. It should be appreciated that the first electrical machine may be operated at a speed and load wherein the power may be directly transferred to the second electrical machine. Various different examples and illustrations of the present disclosure are described in FIGS. 2-12.

Figure 2:
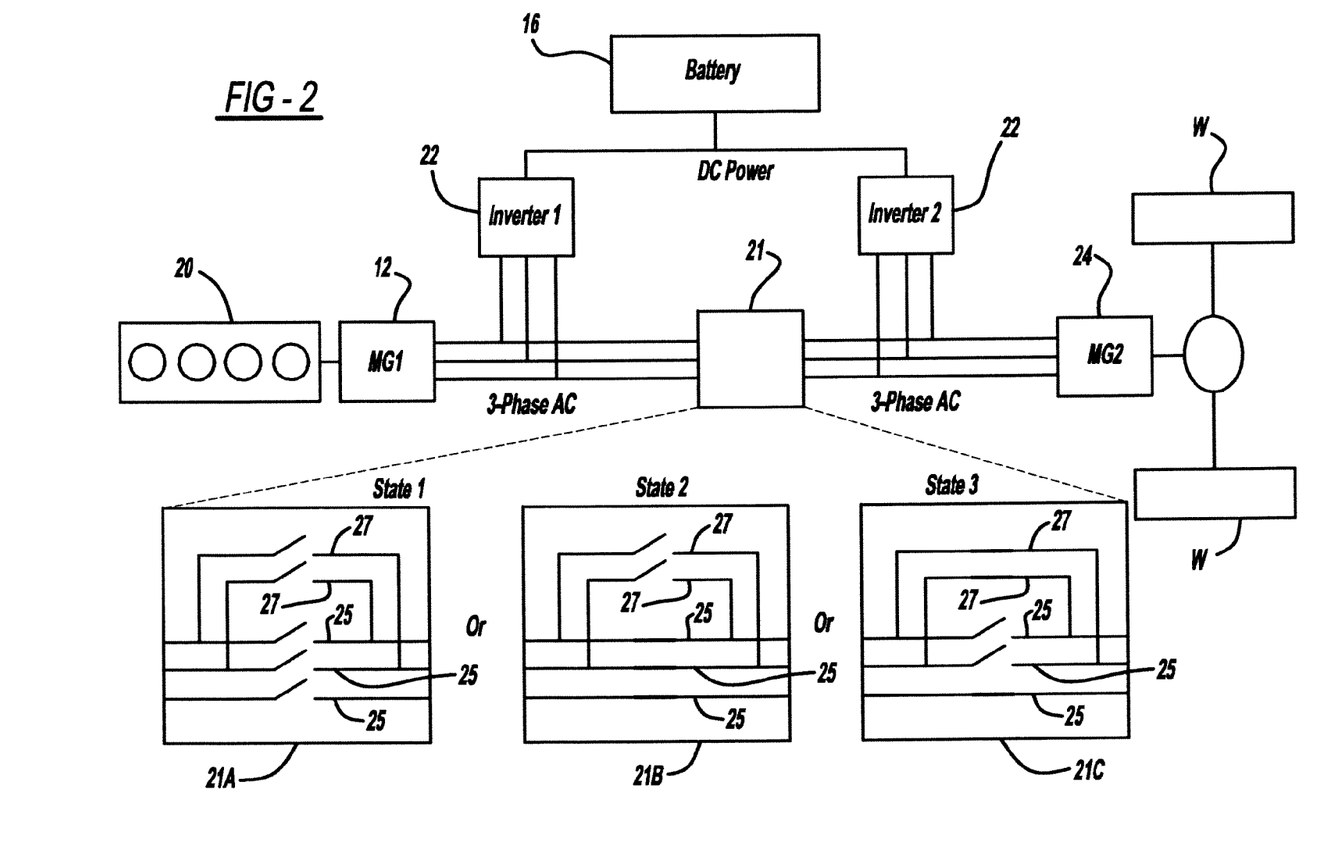
FIG. 2 is a schematic block diagram illustrating a system of directly connecting electrical machines for the vehicle of FIG. 1 and associated operating states.
Figures 3A, 3B:
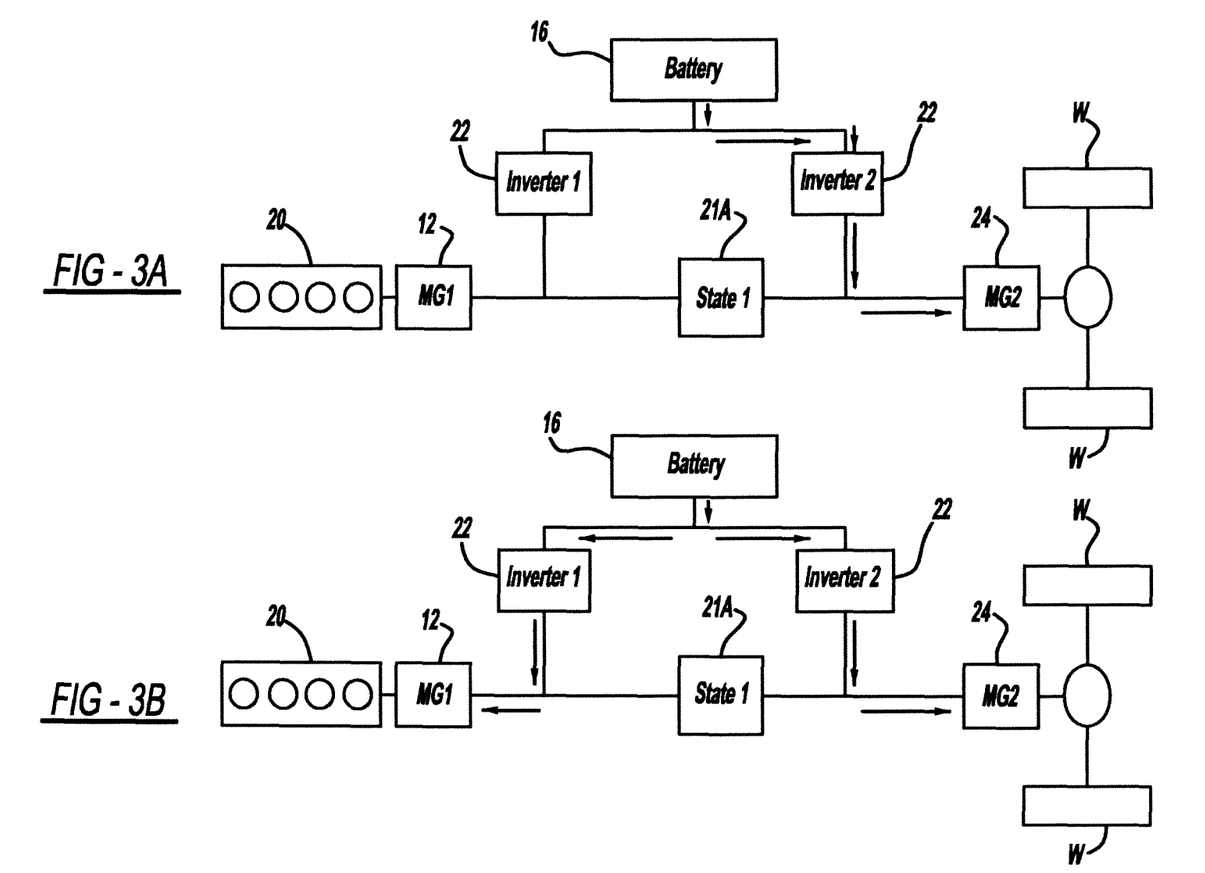
FIG. 3A-3C illustrate schematic power flow distributions for an operating state 1 of a switch box of FIG. 2.
Figures 3C, 4A:
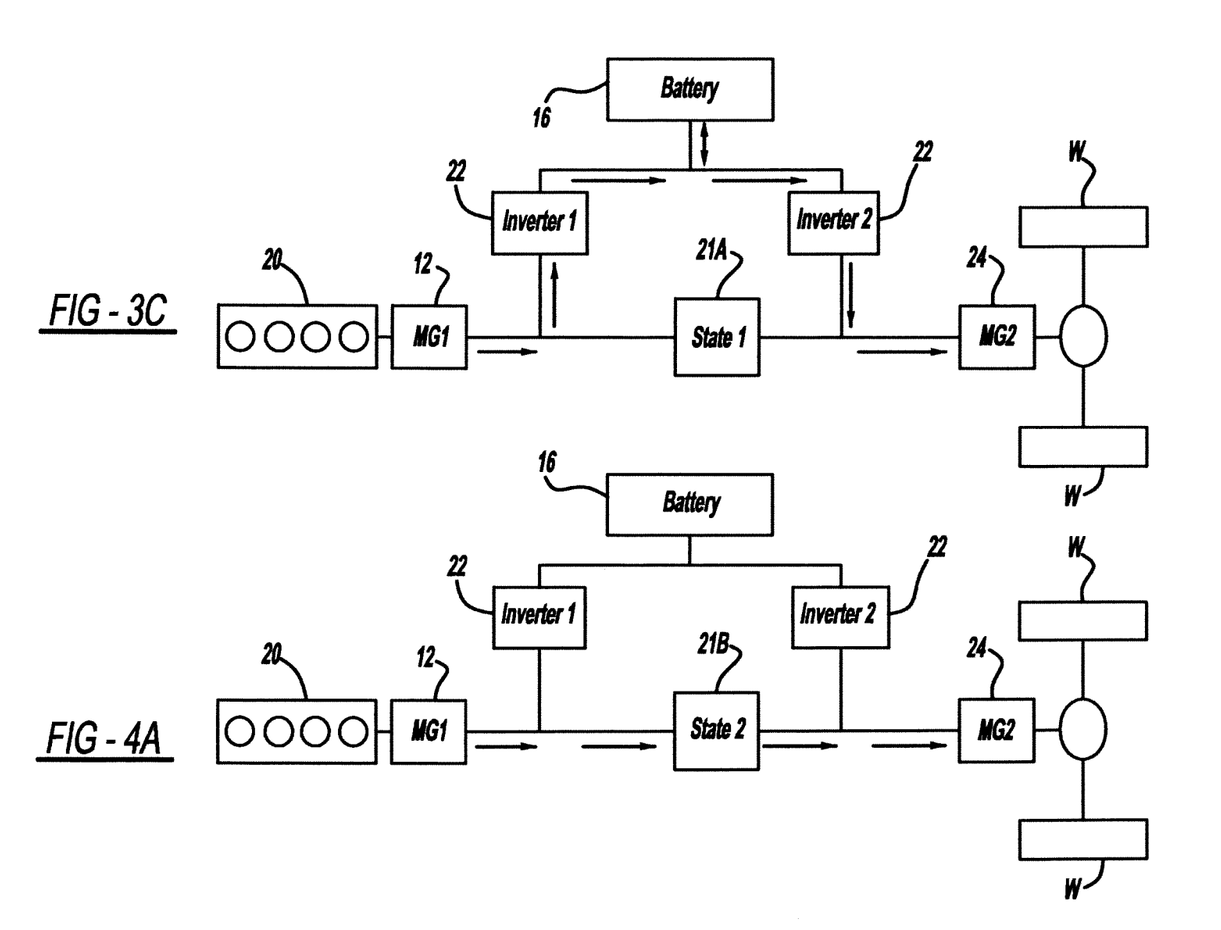
FIG. 4A-4B illustrate schematic power flow distributions for an operating state 2 of the switch box of FIG. 2.
Figures 4B, 5:
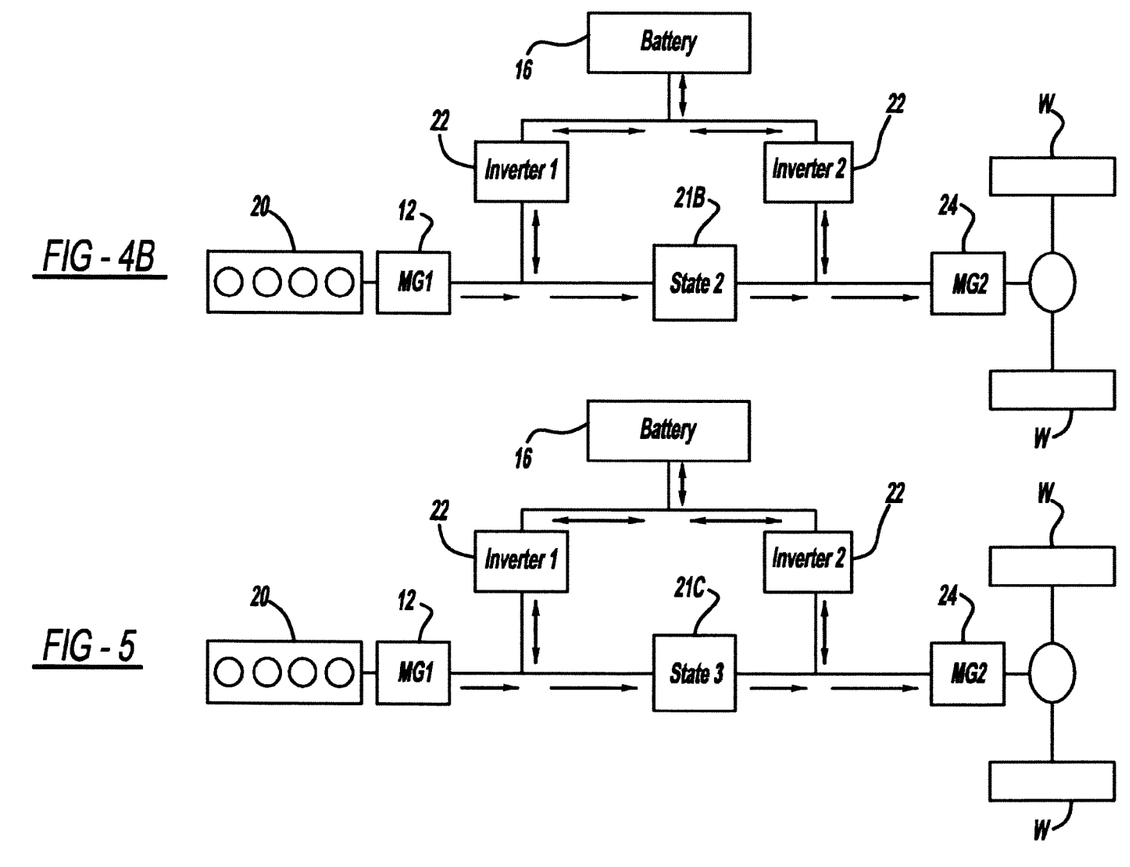
FIG. 5 illustrate schematic power flow distributions for an operating state 3 of the switch box of FIG. 2.

FIG. 2 illustrates an example schematic system for a vehicle 10 including a switch box 21 that allows for direct AC/AC connection between MG1 12 and MG2 24. Loss across a switch box 21 is relatively low and far less than an inverter. In this example, engine 20 is coupled to MG1 12 which can deliver electrical power to an inverter 22 to be received by a battery 16, another inverter 22 or a switch box 21. The energy can then be transferred to MG2 24 and then the wheels W. Energy then can flow in either direction as shown by the other FIGS. An exploded view of various operating states of box 21 is further shown in FIG. 2. In this example, the switch box 21 can operate in three operating states represented by state 1 (21A), state 2 (21 B), and state 3 (21C). Various modes of energy flow for state 1 are shown in FIGS. 3A-3C. State 2 is shown in FIGS. 4A-4B and State 3 is shown in FIG. 5. Table 1 below illustrates various characteristics associated with each operating state.

TABLE 1

| Mode | Engine | Battery | Inverter1 | MG1 | Switch | Inverter2 | MG2 | Description |
|---|---|---|---|---|---|---|---|---|
| Mode 1 | Off | Power Out | | | State 1 | DC to AC | AC to mechanical | EV-drive |

TABLE 1-continued

| Mode | Engine | Battery | Inverter1 | MG1 | Switch | Inverter2 | MG2 | Description |
|---|---|---|---|---|---|---|---|---|
| Mode 2 | Crank | Power Out | DC to AC | AC to mechanical | State 1 | DC to AC | AC to mechanical | Engine crank while driving |
| Mode 3 | Power | Power in/out | AC to DC | Mechanical to AC | State 1 | DC to AC | AC to mechanical | HEV-Engine to wheels, battery boost or charge as necessary |
| Mode 4a | Power | | | Mechanical to AC | State 2 | | AC to mechanical | HEV-Engine to wheels |
| Mode 4b | Power | Power out | DC to AC | Mechanical to AC | State 2 | DC to AC | AC to mechanical | HEV-Engine to wheels w/battery boost using one or both inverters |
| Mode 4c | Power | Power in | AC to DC | Mechanical to AC | State 2 | AC to DC | AC to mechanical | HEV-Engine to wheels w/battery charge using one or both inverters |
| Mode 4d | Power | Power in/out/non | AC to DC | Mechanical to AC | State 2 | DC to AC | AC to mechanical | HEV-Engine to wheels using AC and DC power, battery charge/boost as needed |
| Mode 5 | Spinning (passable) | Power in | AC to DC | AC to mechanical | State 2 | AC to DC | Mechanical to AC | Braking - Wheel power to battery using one or both inverters. Engine may spin if extra power is available |
| Mode 6a | Power | | | Mechanical to AC | State 3 | | AC to mechanical | HEV-Engine to wheels (inverse), drive motor spinning backwards |
| Mode 6b | Power | Power out | DC to AC | Mechanical to AC | State 3 | DC to AC | AC to mechanical | HEV-Engine to wheels (reverse), drive motor spinning backwards w/battery boost using one or both inverters |
| Mode 6c | Power | Power in | AC to DC | Mechanical to AC | State 3 | AC to DC | AC to mechanical | HEV-Engine to wheels (reverse), drive motor spinning backwards w/battery charge using one or both inverters |
| Mode 6d | Power | Power in/out/non | AC to DC | Mechanical to AC | State 3 | DC to AC | AC to mechanical | HEV-Engine to wheels (reverse), using AC and DC power, battery charge/boost as needed |

Power is transferred across a 3-phase AC bus. Switch box 21 includes three lines/switches 25 for the three phase AC transfer. State 1 is represented by box 21A where all three switches 25 are open. When the switches 25 are open, energy cannot transfer directly between MG1 and MG2. Accordingly, the energy is converted from AC (leaving MG1) to DC through inverter 22 and then is either received by battery 16 for charging or reconverted back to AC in the second inverter 22 before being delivered to MG2. Having two inverters allows for operation of either MG's without direct influence on the other. As shown in FIG. 3A, MG1 12 can run idle or be completely turned off while battery 16 delivers energy to MG2 24 through the second inverter 22. FIG. 3B illustrates a example where energy is transferred from battery 16 to both MG1 12 and MG2 24. This can be desirable for cranking the engine and thus needing MG1 12 to operate as a motor rather than a generator to deliver energy to the engine 20. FIG. 3C illustrates an example of energy flow where power from MG1 12 charges battery 16 and drives MG2 24 simultaneously.

As shown in box 21B, state 2 is an operating state where the three switches 25 are closed providing a direct electronic link between MG1 12 and MG2 24. FIG. 4A illustrates example energy flow patterns for the vehicle operating in state 2. Switch box 21 B allows AC power generated in MG1 12 to flow directly to MG2 24. In this example, the energy flow bypasses the inverters and therefore removing undesired efficiency loss associated with the inverters 22. In this embodiment, MG1 12 is directly linked to MG2 and thus are operating at proportional speeds. This is ideal for cruise control conditions for example and increases efficiency of the power distribution of the vehicle. Energy loss across the switches associated with 21A is far less than that of inverters 22. FIG. 4B illustrates an example where the energy flows directly through switch box 21A as well as through the inverters 22 and to battery 16 or the other inverter. The bidirectional arrows represent that energy can be delivered in both directions (i.e., in and out of the battery 16 from and to MG1 12 and MG2 24. Accordingly, the wheels W can be powered by A/C power from the engine 20 and DC power from the batter 16. The battery can also be charging simultaneously while direct power is transferred from MG1 to MG2. The battery 16 can boost or charge using one or both inverters 22.

FIG. 5 illustrates a third state (state 3) energy flow path associated with an operating state of switch box 21C. In this embodiment switches 27 (shown open in box 21A and 21 B) are closed along with one switch 25. Switches 27, when closed, allow for a cross energy linkage across the three phases which allows direct energy flow between MG1 12 and MG2 24 while either MG1 or MG2 is operating in reverse. Accordingly, MG1 12 can spin forward while MG2 can spin backward.

Figure 6:
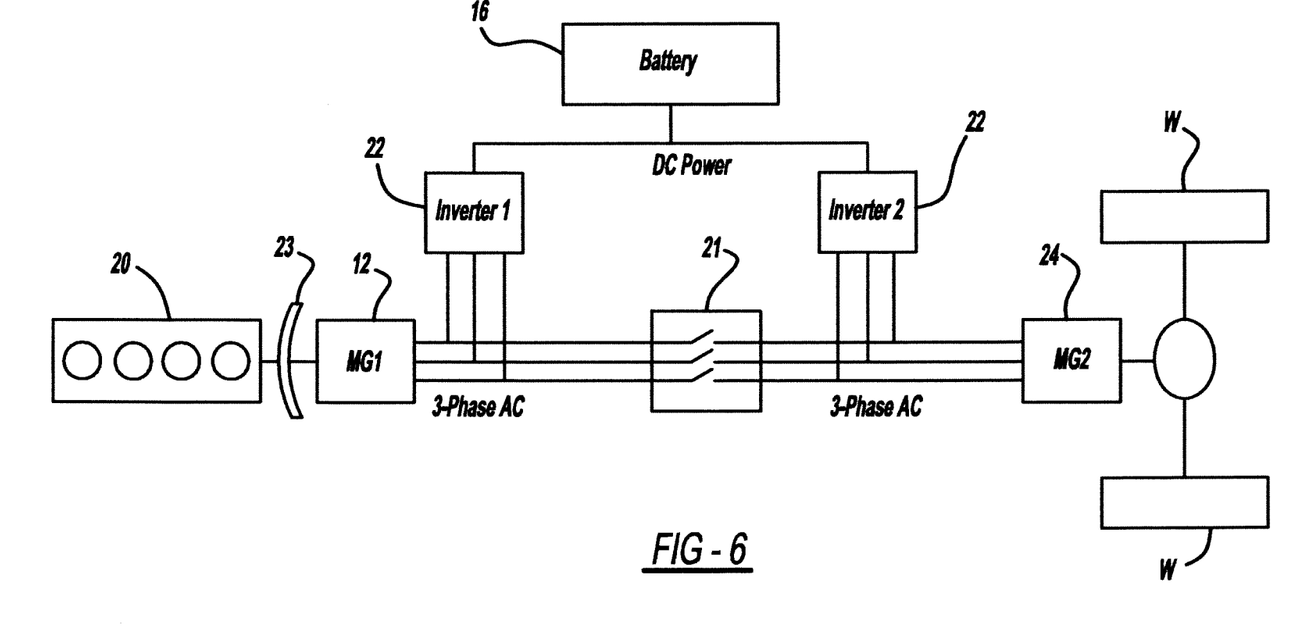
FIG. 6 is a schematic block diagram of the system of FIG. 2 having a clutch.

FIGS. 6-12 illustrate various exemplary embodiments associated with the present disclosure. FIG. 6 illustrates a system further including a clutch or torque converter 23 disposed between the engine 20 and the MG1 12. The clutch allows for engine 20 disengagement during switching associated with switch box 21. Disengaging the engine 20 can reduce burden on associated contactors. A further feature associated with disengagement includes allowing the engine to run and engaging the switch box 21 to close the switches prior to launching the vehicle. This allows for an option to use switch box 21 during conditions where inverter 22 is limited or undesirable.

Figure 7:
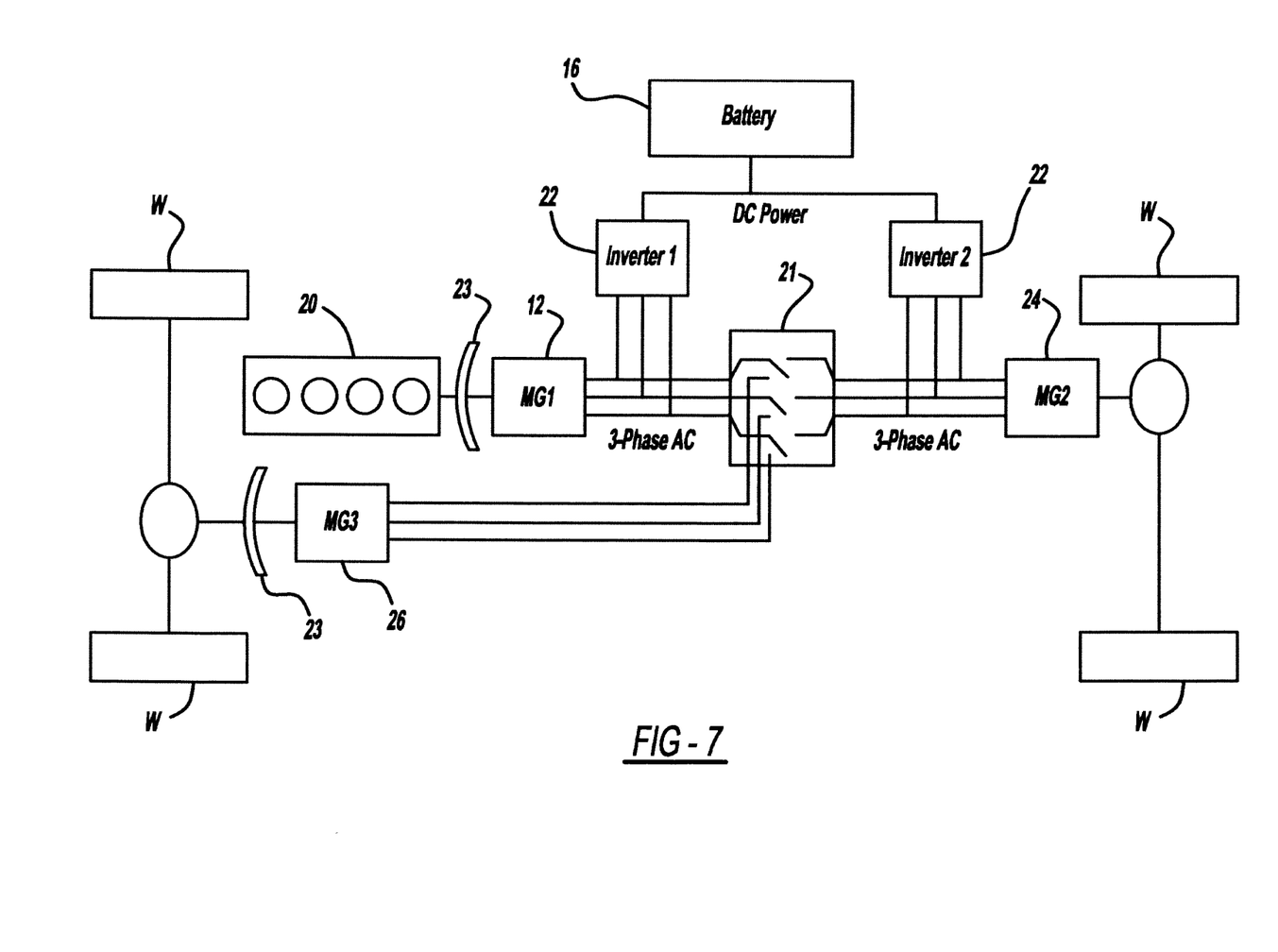
FIG. 7 is a schematic block diagram of the system of FIG. 2 having a third motor/generator coupled to front wheels and a switch box.

FIGS. 7-11 illustrate example systems including a third electrical machine MG3 26 coupled to front wheels W. These embodiments allow for selective four-wheel drive modes for example vehicles associated with the present disclosure. In FIG. 7, MG3 26 is linked directly to the switch box 21. A second clutch/torque converter may be disposed between front wheels W and MG3 26. The system can operate with a third motor/generator (MG) without a clutch in an alternative embodiment. In this example, a clutch is provided. Power can be delivered directly from engine 20 to MG3 26. Clutch 23 engaged to MG3 26 allows for operational independence from switch box 21. Accordingly, the clutch 23 allows for disengagement of front wheels W from the system.

Figure 8:
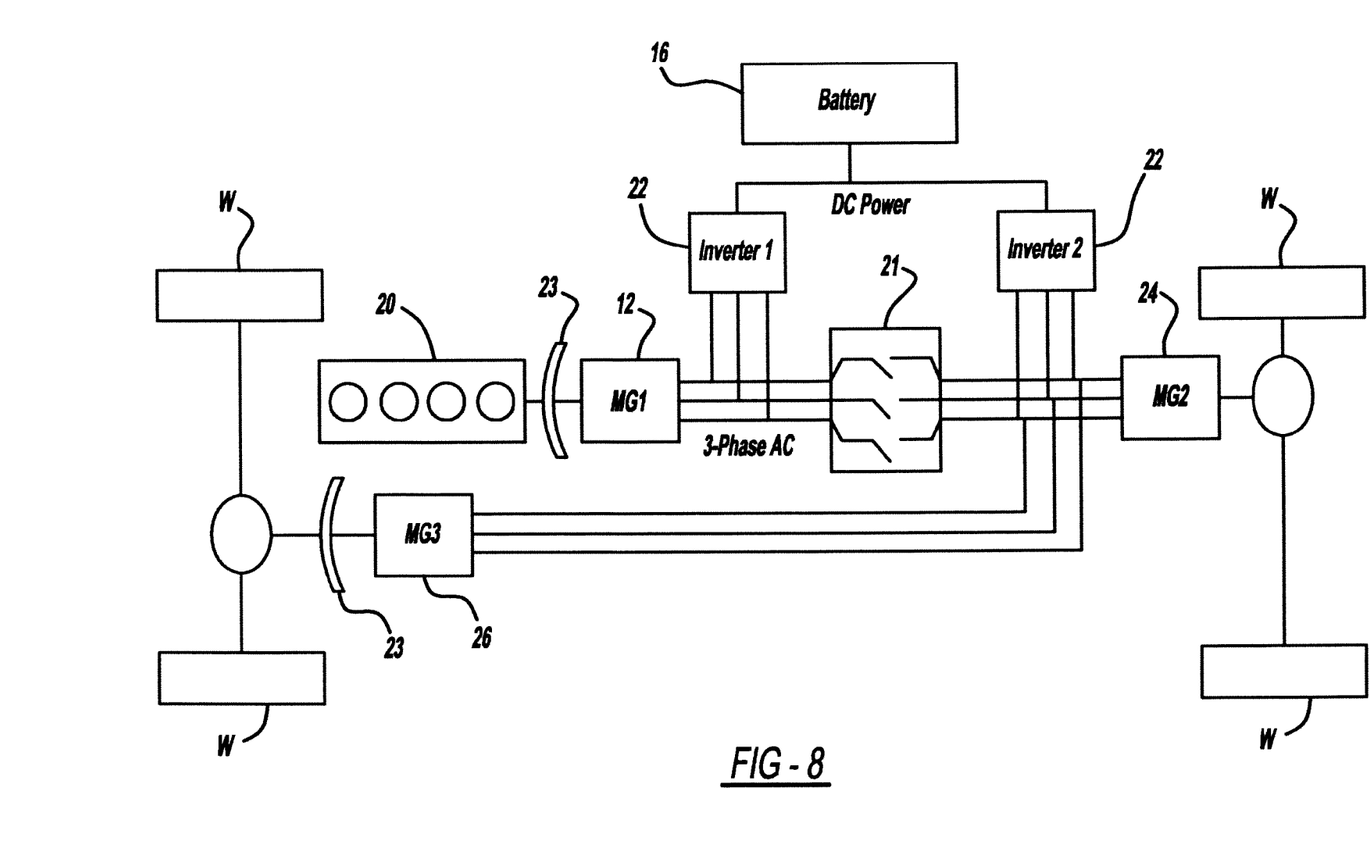
FIG. 8 is schematic block diagram of the system of FIG. 2 having a third motor/generator coupled to front wheels and a second inverter.

FIG. 8 includes MG3 26 but coupled to the MG2 24 side of the switch box 21. This embodiment links MG1 to both the front and rear wheels W if the switches of switch box 21 are closed. Moreover, if the vehicle is operating in state 1 where the switches are open, power from engine 20 can still be delivered to MG3 26 through inverter 22 (inverter 2). MG2 24 and MG3 26 are hard coupled. MG3 can still be disengaged from wheels W through clutch 23.

Figure 9:
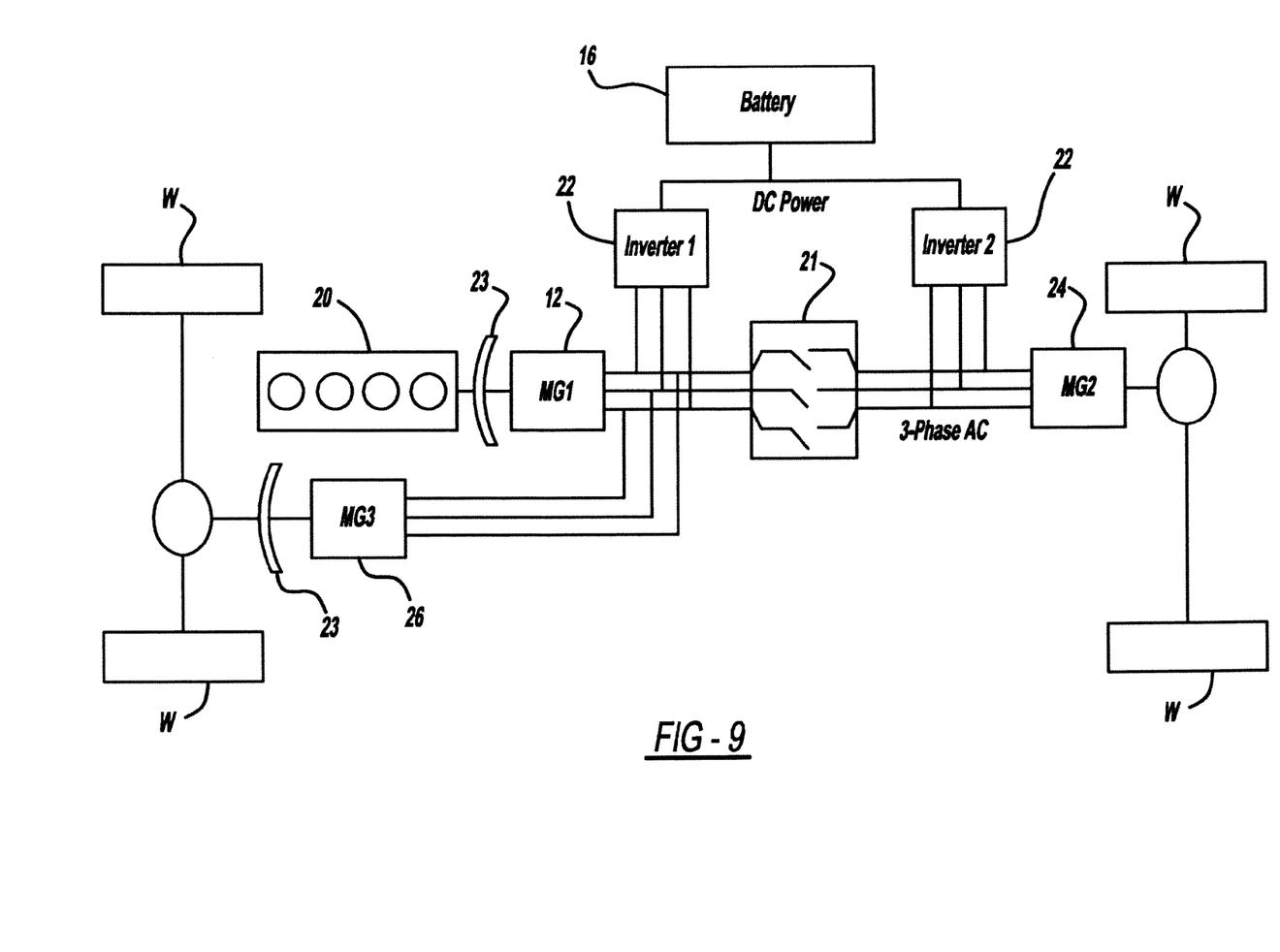
FIG. 9 is schematic block diagram of the system of FIG. 2 having a third motor/generator coupled to front wheels and a first inverter.

FIG. 9 illustrates MG3 26 hard coupled to MG1 12. Accordingly, both MG's will spin at a constant proportional speed. The first inverter 22 (inverter 1) can either deliver power to front wheels W by spinning MG1 12 and de-coupling the engine 20 through clutch 23, absorb power from MG1 12 (MG3 26 spinning while de-coupled from the wheels W through clutch 23), or operating modulate power as MG1 12 powers the front wheels W through a state 2 operating state of switch box 21.

Figure 10:
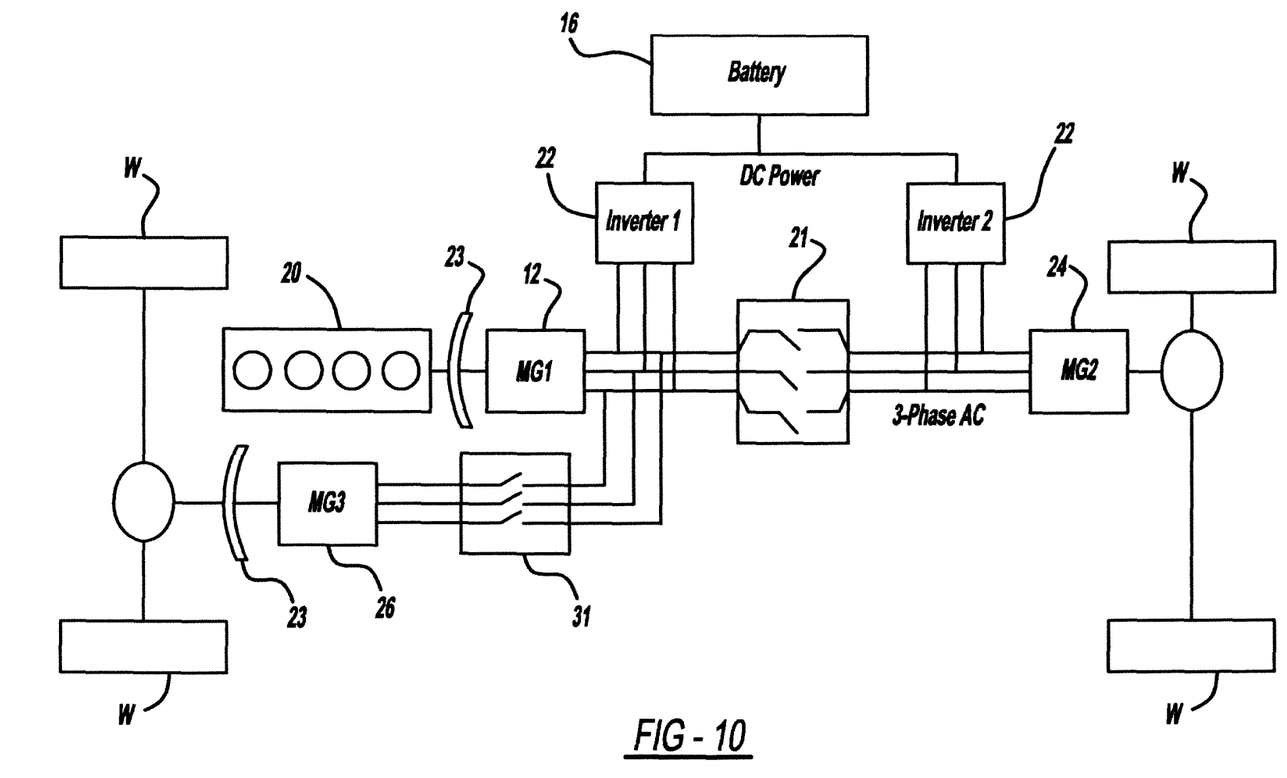
FIG. 10 is schematic block diagram of the system of FIG. 2 having a third motor/generator coupled to front wheels and a first inverter and a second switch box disposed between the inverter and the third motor/generator.
Figure 11:
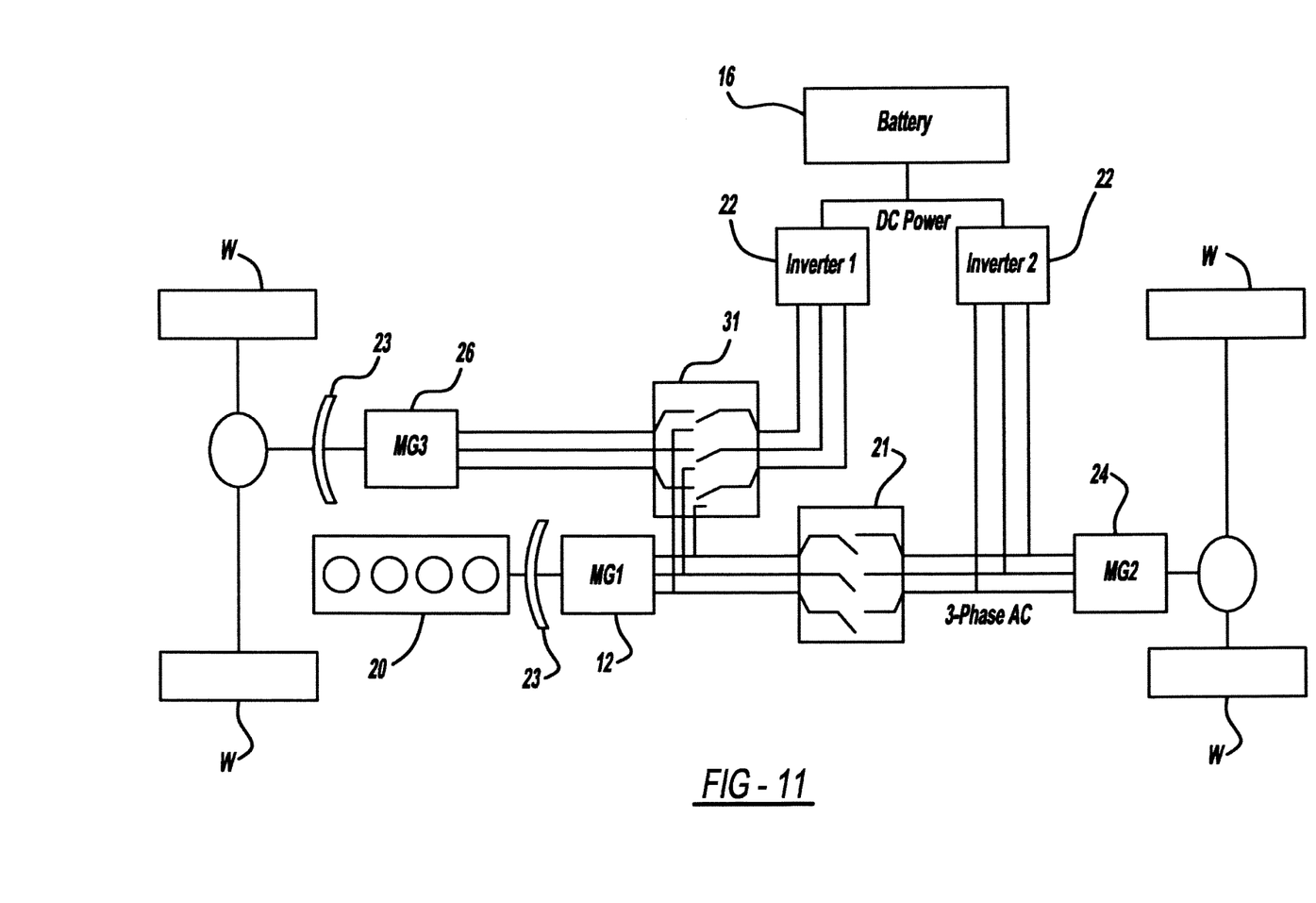
FIG. 11 is schematic block diagram of the system of FIG. 2 having a third motor/generator coupled to front wheels with a second switch box disposed between a first inverter and the third motor/generator and a first motor/generator.

FIG. 10 illustrates a second switch box 31 disposed between MG3 26 and the AC bus of MG1 12. This can allow the inverter 22 (inverter 1) to power MG3 26 when box 31 is in a state 2 or state 3 operating state (i.e., the switches are closed). FIG. 11 illustrates an alternative embodiment with a second switch box 31 disposed between the MG3 26 and the first inverter 22 (inverter 1). This arrangement allows for direct switching of switch box 31 to transfer power from the first inverter 22 to either MG1 12 and/or MG3 26. MG3 26 can be hard coupled to the MG1 12 speed if connected but it is not necessary if switches in switch box 31 are open. Accordingly, the inverter 22 can power either MG1 12 or MG3 26 or both. In a further embodiment, MG3 can be linked to the second inverter 22 (inverter 2).

Figure 12:
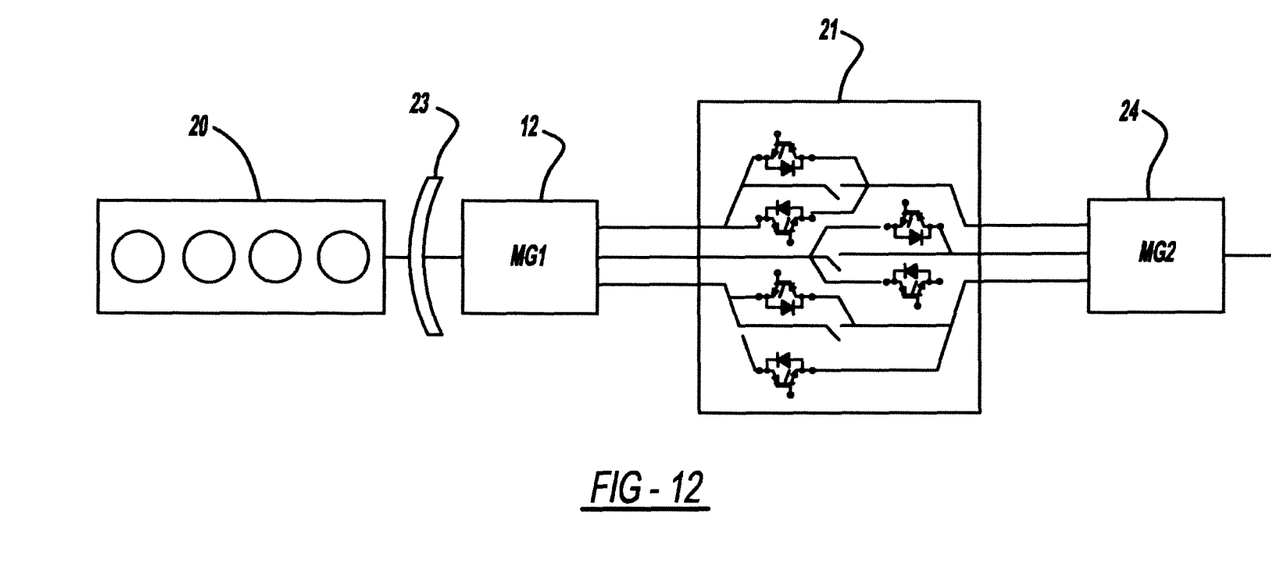
FIG. 12 illustrates a second example block diagram of a switch box associated with the systems of the present disclosure.

FIG. 12 illustrates a switch box 21 with example switches. In an example where close to identical speed alignment between MG1 12 and MG2 24 is not possible, then the switches in box 21 need to close relatively quickly. Mechanical contactors can be used since they have a high level of efficiency, however, their response time may not be adequate in some situations. A hybrid power-electronic/mechanical contactor as shown in box 21 can be used. In this example, two IGBTs for each mechanical contactor are included that allow current to flow in either direction, however only one IGBT may be necessary. This can be used with other power electronics devices, including but not limited to, MOSFETS, thyristors, SCRs, etc. When the switches are closed allowing direct power transfer between electric machines, voltage levels can be monitored by a controller. When the 3-phase voltage aligns (even if just for a brief moment) the solid state switching device engages locking the phases together. This keeps the voltage over the mechanical contactors near zero, which allows them to close with little risk.

Operating the vehicle in e-Direct (i.e., the switches 25 and/or 27 are closed) significantly reduces load on the inverters 22 of the vehicle 10. Accordingly, inverter 22 size can be reduced relative to standard inverters used in vehicles without a switch box 21 and/or 31. Reducing inverter 22 size can reduce hardware costs of the vehicle and overall system efficiency.

The addition of a compliant mechanical coupling device 23 increases the versatility of the system, such as the use of e-Direct to direct power distribution between front axle and rear axle of the vehicle 10. The e-Direct hardware can be positioned such that either the front 12 or rear motor/generator 24 can be engaged. This can also be implemented wherein both drive motors 24 and 26 are engaged at the same time or independently.

An example of a mechanical coupling device may be a clutch 23, such as in a conventional manual transmission or a dual clutch transmission, a wet clutch as found in an automatic transmission, a torque converter as found in an automatic transmission, a dog clutch, or any other mechanical linking device that allows ~100% torque transfer in one operating mode and ~0% torque transfer in another operation mode. The mechanical coupling device 23 may also be able to transfer a wide range of torque from 0-100% or have torque multiplying capacity, such as in an automatic transmission torque converter. As a result, a generator 12 may be disengaged from the engine 20 and power or torque may be transferred to the generator 12 while the engine 20 is spinning at a speed independent of the generator. A feature such as e-Direct can be enhanced by allowing e-Direct to be engaged when the vehicle is stopped through the use of the mechanical slip device (i.e., coupling device 23). The generator 12 can be hard coupled to the motor 24 through the 3-phase bus, making the generator/motor 12/24 act as if they are mechanically linked. Another advantage is that the clutch/torque converter/compliant mechanical coupling device 23 allows the vehicle 10 to be started without the need for either inverter 22 or battery 16.

The inclusion of a switch box 21 with switches 25, such as a two-position switch, allows e-Direct operation to either the front or rear wheels W. The pole/gear ratio can be optimized so that the engine 20 can transfer power through e-Direct in multiple gears, i.e. at multiple optimized engine speeds. In an example, the system may include hard coupling the 3-phase AC power cables to the same bus as the generator 12 or the rear drive motor 24. A front drive motor 26 can have the same electrical frequency as the rear motor 24. This means that the two motors will always spin at speeds inversely proportionally to their relative number of pole. However, the axle speed can vary as the vehicle drives around turns, tire wear, gearing, etc. and therefore the compliant mechanical coupling accommodates for these variations. As the vehicle goes around a turn, the front wheels W travel a further distance than the rear wheels W. This means that the front motor 26 spins proportionally faster than the rear motor 24. Since the e-Direct configuration hard couples the electrical phases, the front motor 24 can benefit from a compliant coupling between the motor and wheels W. The compliant coupling (With similar possibilities as described by the engine/generator compliant coupler) and drive unit between the front motor 26 and wheels W can be configured so that the motor always spins faster than the coupling output speed (using some kind of slip device or torque converter 23}. This means that the motor may provide power to the wheels.

In another example the front wheel drive motor 26 may be hard coupled to the generator 12. Thus, the front drive motor 26 and generator 12 may spin at a constant proportional speed. The inverter 22 can either power the front wheels W, absorb power from the generator 12, or modulate power as the generator 12 powers the front wheels W during e-Direct operation. A second e-Direct switching device 31 may be added so that the front and/or rear motor is proportionally hard-coupled coupled to the generator 12. As a result, the first inverter 22 may power the front motor 26 or electric machine. The generator 12 will spin the front motor 26 so that the engine 20 can be decoupled if so required.

In operation, numerous variations can be made using the above described configuration as its basis. For example:

Switching inverters on/off to either operate conventionally or through inverter-less operation.

Using IGBTs or other controlled circuitry to switch between routing electrical machine power to the inverter or to other electrical machine.

Using different types of motors such as permanent magnet synchronous machines or AC induction machines in order to increase or reduce the tolerance for timing variations between the two electrical machines.

Rectifying or otherwise modifying the magnitude or timing of the AC signal to control output power.

Adjusting phase or bus capacitance, inductance or any other characteristic in order to manage the power or robustness between the two electrical machines.

Actively or passively controlling engine power to align timing between the electrical phases of each electric machine.

The hybrid vehicle may include other features conventionally known for a vehicle, such as a gasoline motor, other controllers, a drive train or the like. Many modifications and variations of the present disclosure are possible in light of the above teachings. Therefore, within the scope of the appended claim, the present disclosure may be practiced other than as specifically described.

What is claimed is:

1. A system for a hybrid vehicle comprising:
    an engine;
    a first inverter coupled to a second inverter;
    a first electrical machine coupled to the engine and the first inverter;
    a second electrical machine coupled to the second inverter and a first wheel axle of the vehicle;
    a third electrical machine coupled to the first inverter and a second wheel axle of the vehicle;
    a high voltage battery coupled to both the first inverter and the second inverter;
    a first switch box disposed between the first electrical machine and the second electrical machine, the switch box for selectively forming a direct electrical connection between the first electrical machine to the second electrical machine; and
    a second switch box disposed between the third electrical machine and the first electrical machine for selectively forming a direct electrical connection between the first electrical machine and the second electrical machine.

2. The system of claim 1, wherein the first switch box includes a plurality of switches that allow for vehicle operation in a plurality of operating states.

3. The system of claim 2, wherein the switches are all open in a first operating state preventing electrical connection between the first electrical machine and the second electrical machine.

4. The system of claim 2, wherein the switches are all closed in a second operating state to form an electrical connection between the first electrical machine and the second electrical machine.

5. The system of claim 1, wherein each of the second electrical machine and the and third electrical machine is operable to be a generator when spinning a negative torque direction and a motor when spinning in an opposite positive torque direction.

6. The system of claim 1, wherein power can be transferred from the engine to the battery and from the battery to the wheel axle.

7. The system of claim 1, further comprising a mechanical engagement device disposed between the engine and the first electrical machine adapted to selectively decouple the engine from the first electrical machine.

8. The system of claim 7, wherein the mechanical engagement device is a clutch.

9. The system of claim 1, further comprising a mechanical engagement device disposed between the second wheel axle and the third electrical machine adapted to selectively decouple the wheel axle from the third electrical machine.

10. The system of claim 1, wherein the second switch box provides for selectively connecting the third electrical machine and the first inverter.

11. The system of claim 1 wherein the first switch box includes a plurality of switches having power-electronic and mechanical contactors.

12. The system of claim 1, wherein the system is configured to operate in a state wherein the first switch box and the second switch box are configured so that power is provided by the engine to rotate both the first wheel axle and the second wheel axle.

13. The system of claim 1, wherein the system is configured to operate in a state wherein the first switch box is configured so that power is provided by the engine and the first electrical machine to the second electrical machine for rotating the first wheel axle and power is provided to the third electrical machine for rotating the second wheel axle only through the first inverter.

* * * * *